United States Patent

[11] 3,587,311

| [72] | Inventor | Robert F. Hays, Jr.<br>Charlottesville, Va. |
|---|---|---|
| [21] | Appl. No. | 834,838 |
| [22] | Filed | June 19, 1969 |
| [45] | Patented | June 28, 1971 |
| [73] | Assignee | Teledyne, Inc., Los Angeles, Calif. |

[54] AIRCRAFT INSTRUMENT SYSTEM
7 Claims, 11 Drawing Figs.

| [52] | U.S. Cl. | 73/180 |
|---|---|---|
| [51] | Int. Cl. | G01c 21/00 |
| [50] | Field of Search | 340/27 (SEST); 73/180; 244/77 (D) |

[56] References Cited
UNITED STATES PATENTS

| 2,193,077 | 3/1940 | Saxman, Jr. | 340/27UX |
| 2,945,375 | 7/1960 | Greene et al. | 244/77 |

*Primary Examiner*—Donald O. Woodiel

ABSTRACT: The ratio between a change in local airstream direction and the corresponding change in a resultant output representing "normalized angle of attack" is varied as a function of flap position and the resultant output is biased as a function of flap position so that the resultant output represents zero "normalized angle of attack" whenever the combination of flap position and local airstream direction is such that the aerodynamic lift is zero and so that the resultant output represents 100 percent "normalized angle of attack" whenever the combination of flap position and local airstream direction is such that a further increase in angle of attack would result in stalling of the aircraft. The resultant output representing "normalized angle of attack" is utilized for indication or control purposes.

INVENTOR

Robert F. Hays, Jr.

INVENTOR

Robert A. Nay, Jr.

AIRCRAFT INSTRUMENT SYSTEM

This invention relates generally to aircraft instruments and to an improved Angle of Attack Indicator, Aircraft Control Systems, or other responsive means.

In the past, angle of attack indicators have been used to indicate local angle of attack, which is the direction of the airstream at the point where the airstream direction transducer is installed relative to an arbitrary reference direction. In this patent application I use the terms "local angle of attack" and "local airstream direction" interchangeably. Airplanes stall or become unstable at different values of local angle of attack depending upon the type of aircraft, the location of the airstream direction transducer, the reference airstream direction, and the position of the flaps. As angle of attack has been indicated in the past, there is no general correspondence between the indicated angle of attack and the condition of flight for different types of aircraft or even for the same aircraft when different flap positions are used.

In my system I vary the ratio between a change in local airstream direction and the resulting change in angle of attack indication with the ratio being determined by flap position and I displace the indication relative to local airstream direction with the displacement being determined by flap position. By making the ratio the proper function of flap position and by making the displacement the proper function of flap position I make the indicator read zero whenever the combination of flap position and local airstream direction is such that the aerodynamic lift of the aircraft is zero, and I make the indicator read 1.0 or 100 percent whenever the combination of flap position and local airstream direction is such that a further increase in angle of attack will cause the aircraft to stall or become unstable in flight.

For some aircraft the local airstream direction at the point where the airstream direction-determining means is installed may also be displaced by extending the landing gear, by tilting the wing to change its angle of incidence relative to the fuselage, by tilting the nose section of the aircraft relative to the fuselage, by the attachment of external stores to the aircraft, or by some other means. For such aircraft I mean for the bias output controlled by flap position to also include a bias component controlled by any other means which produces a displacement of the local airstream direction at the point where the airstream direction-determining means is installed. My indicator system shows the ratio between the absolute angle of attack, measured from the reference angle at which the aerodynamic lift is zero for the flap position being used, and the maximum usable value of absolute angle of attack for the flap position being used. I call this indication the "normalized angle of attack."

The indication of normalized angle of attack has the advantage of the indication having the same meaning in various types of aircraft and with various flap positions. There is a logical correspondence between this indication and the true flight condition of the aircraft. Independent of flap position the normalized angle of attack is always the absolute angle of attack expressed as a portion of the maximum usable value.

In my system I produce a resultant output which represents normalized angle of attack. This resultant output may be used to control an indicator as I have just described. This resultant output may also be used for control purposes. For example, the resultant output representing normalized angle of attack may be used as an input to an automatic pilot, a flight director system, or an automatic throttle control system.

An object is to provide an angle of attack indicator system in which a particular indication always indicates that the combination of angle of attack and flap position is such that a further increase in angle of attack will result in stall or loss of control of the aircraft.

Another object is to indicate the ratio of angle of attack measured from the point at which the aerodynamic lift is zero for the flap position being used to the maximum usable angle attack for the same flap position.

A further object is to provide an angle of attack indicator system in which an indication of zero indicates that the angle of attack is at the value which produces zero aerodynamic lift for the flap position being used and an indication of 1.0 indicates that the angle of attack is at the maximum usable value for the flap position being used.

An additional object is to provide an aircraft instrument system in which the safe operating range of angle of attack for each flap position is indicated by the same range on a single indicator scale.

An additional object of the invention is to provide an output representing "normalized angle of attack" for utilization by indicators or control systems. By "normalized angle of attack" I mean the ratio between the angle of attack measured from the point at which the aerodynamic lift is zero for the flap position being used to the maximum usable angle of attack, measured from the zero lift point, for the same flap position. By maximum usable angle of attack I mean an angle of attack which if exceeded will result in stall or loss of control of the aircraft.

An additional object of the invention is to provide an output representing the ratio of the lift coefficient to the maximum usable value of lift coefficient for the flap position being used. This output may be used as an input to an indicator or to a control system.

Other objects will be evident in the following description.

IN THE DRAWINGS

FIG. 1 is a block diagram of my improved angle of attack instrument system.

FIG. 2 is a block diagram of a system in which the output of the airstream direction determining means or transducer is passed through a gain control which is controlled by flap position and is then summed with a bias output controlled by flap position to produce a resultant output representing normalized angle of attack which resultant output is applied to utilizing means which may be an indicator or a control system.

FIG. 3 is a block diagram of a system in which the output of the airstream direction transducer is summed with a bias output controlled by flap position and the sum is passed through a gain control which is controlled by flap position to produce a resultant output representing normalized angle of attack which resultant output is applied to utilizing means which may be an indicator or a control system.

FIG. 4 is a block diagram of a system in which two different function generators apply to the airstream direction transducer outputs which are functions of flap position. The resultant output from the airstream direction determining means or transducer represents normalized angle of attack which resultant output is applied to utilizing means which may be an indicator or a control system.

FIG. 5 is a block diagram of a system in which a function generator applies to an airstream direction determining means an output which is a function of flap position. The output of the airstream direction determining means is summed with a bias output which is controlled by flap position and the resultant output which represents normalized angle of attack is applied to an indicator or to a control system.

Figure 2:
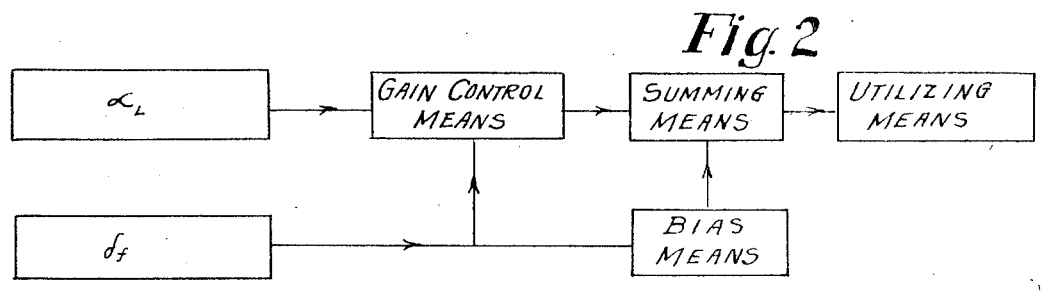
Figure 9:
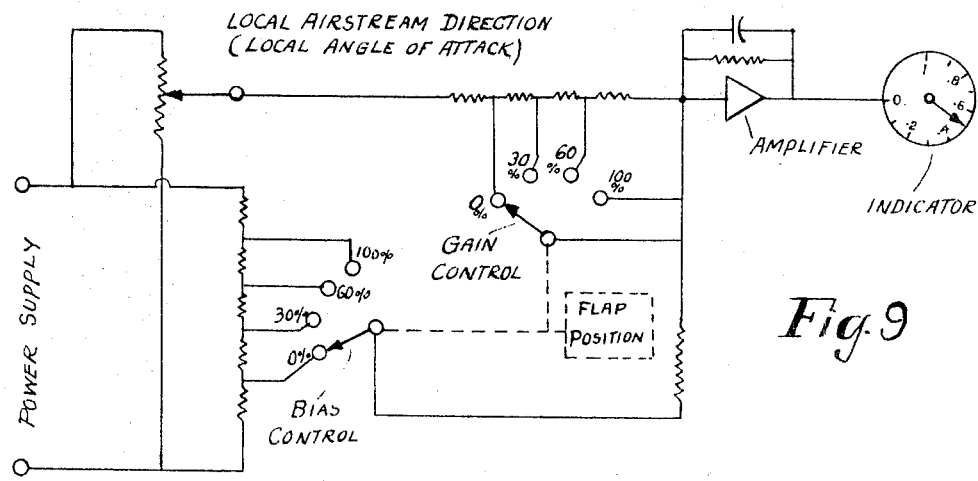

FIG. 9 shows details of an electrical circuit which performs the functions of the system shown as a block diagram in FIG. 2. This particular circuit provides an output representing normalized angle of attack only for discrete flap positions. This output, as before, can be applied to an indicator or to a control system.

Figure 10:
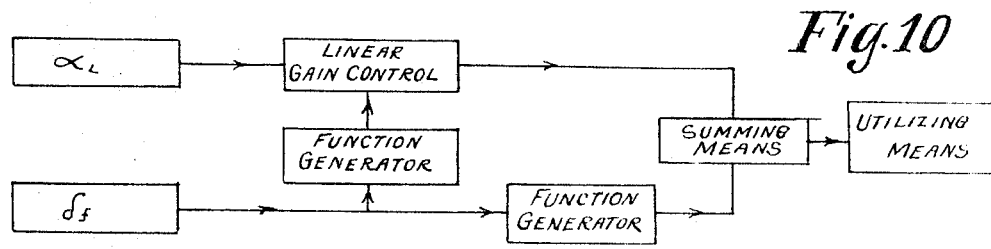

FIG. 10 is a block diagram of a system which performs the same functions as the system shown in FIG. 2. In FIG. 10 the gain control is linear and is controlled by the output of a function generator for which the input is obtained from the flap position determining means. The bias means in this system is a function generator for which the input is obtained from the flap position determining means.

Figure 11:
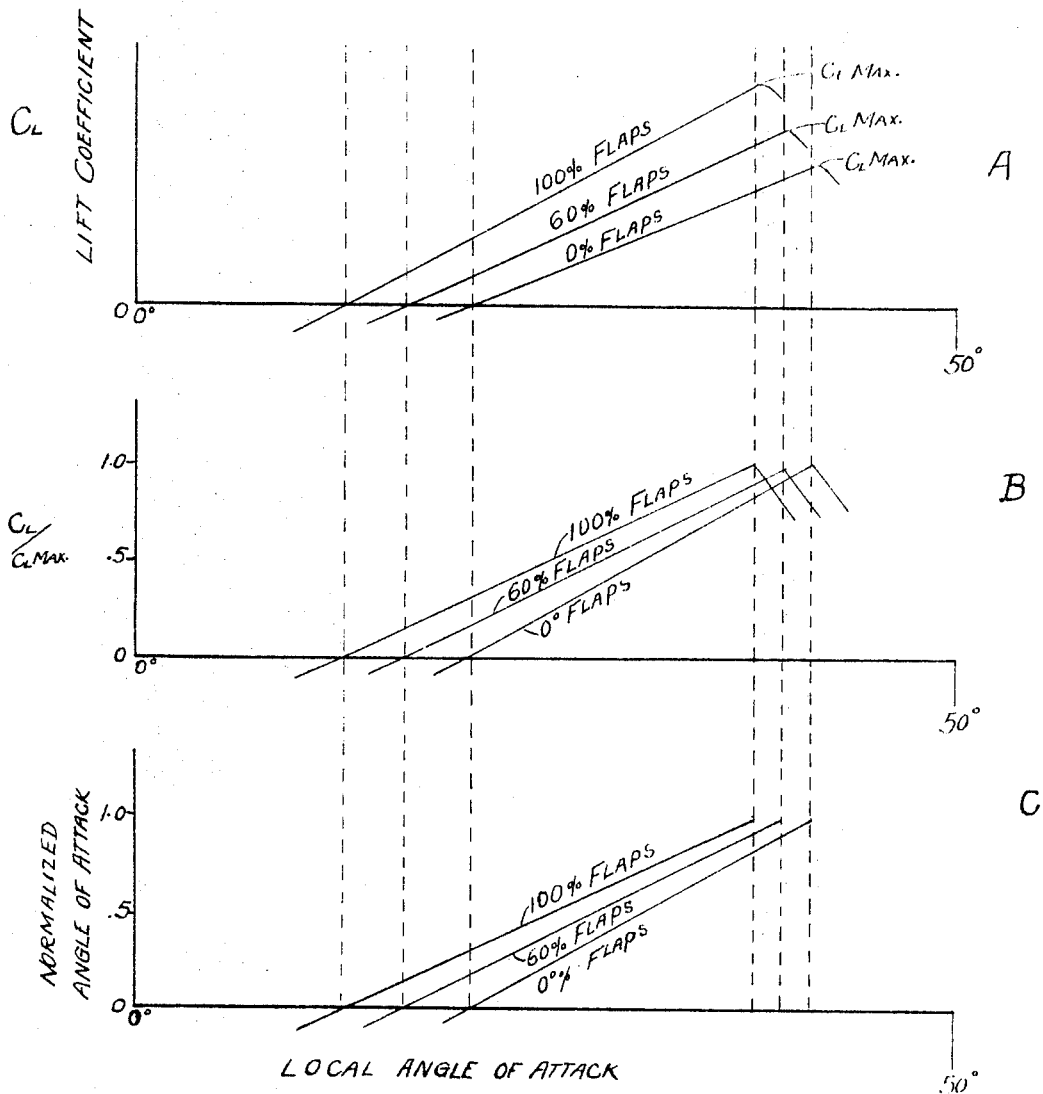

FIG. 11 consists of three parts: A, B, and C. Part A shows how the lift coefficient, $C_L$, for a typical jet propelled aircraft varies relative to local airstream direction or local angle of attack for three different flap positions. Part B shows how $C_L/C_L$Max. varies relative to local angle of attack for the same aircraft. Part C shows how normalized angle of attack varies relative to local angle of attack for the same aircraft.

Figure 1:
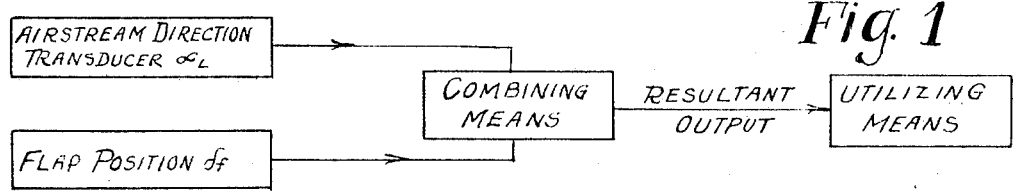

FIG. 1 is a block diagram which shows my system for combining outputs representing local angle of attack and flap position to produce a resultant output representing normalized angle of attack, said resultant output being applied to utilizing means which may be an indicator or a control system. There are various means by which the said outputs may be combined as will be evident in succeeding block diagrams.

FIG. 2 shows a block diagram of a system in which the output of the local airstream direction or local angle of attack determining means is first passed through a ratio determining or gain control means which is controlled by flap position and is then summed with a bias which is controlled by flap position to produce a resultant output representing normalized angle of attack, said resultant output being applied to utilizing means which may be an indicator or a control system.

Figure 3:
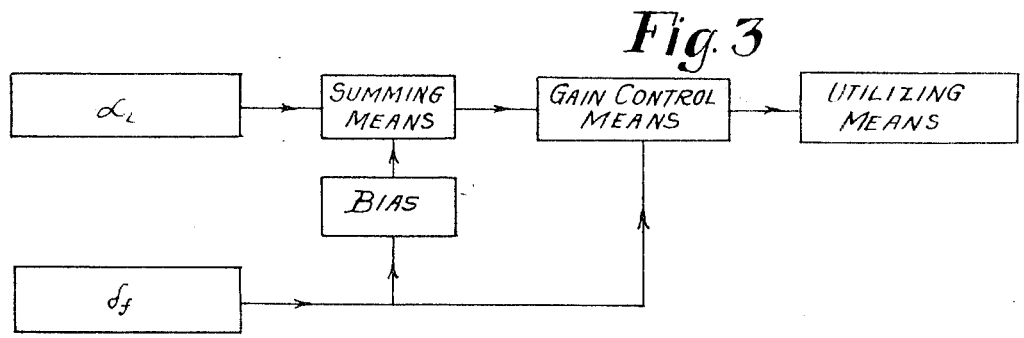

FIG. 3 is a block diagram of a system in which the output of the local airstream direction determining means is first summed with a bias output controlled by flap position and the sum is then passed through a ratio determining means or a gain control which is controlled by flap position to produce the resultant output. Needless to say the bias output in this system is not the same function of flap position as the bias output shown in FIG. 2 since in this system the bias output is passed through the gain control whereas in FIG. 2 this is not done.

Figure 4:
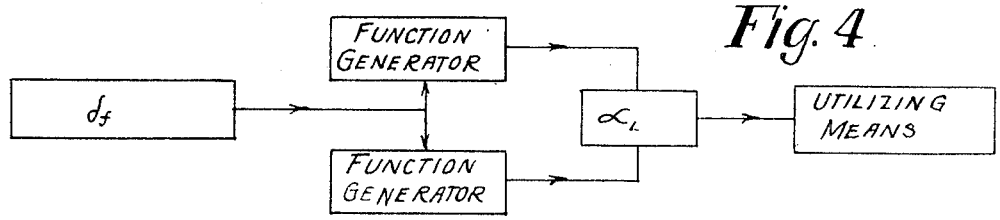

The block diagram of FIG. 4 shows the use of two function generators each having an output which is a function of flap position. The airstream direction determining means interpolates as a function of local airstream direction between the outputs of the two function generators. The average of the outputs from the two function generators is equivalent to the bias output in FIG. 2 and the difference between the outputs of the function generators determines the gain of the airstream direction determining means. Function generators are well known in the art. For example, in a mechanical system the lift of a cam follower can be made the desired function of the angular position of a cam by shaping the cam in the proper manner; and in an electrical system the electrical output of a nonlinear circuit can be made the desired function of the electrical input by properly biasing diodes in the circuit.

Figure 5:
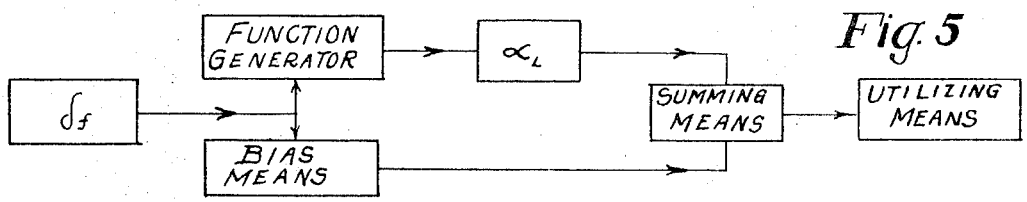

The block diagram shown in FIG. 5 is somewhat similar to the one shown in FIG. 4. The output of a function generator controlled by flap position is applied to the airstream direction determining means to determine the gain thereof. The output of the airstream direction determining means is summed with the output of a bias means controlled by flap position to produce the resultant output representing normalized angle of attack.

Figure 6:
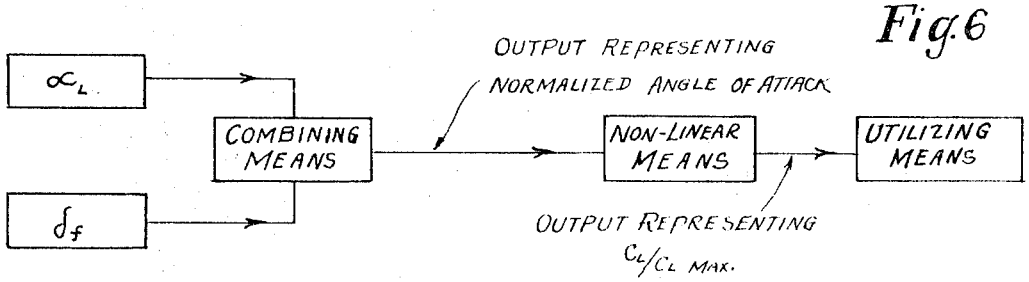
FIG. 6 is a block diagram of a system in which the output representing normalized angle of attack is passed through nonlinear means to produce a resultant output representing the ratio of lift coefficient to the maximum available lift coefficient for the flap position being used. The resultant output is applied to an indicator or to a control system.

For most aircraft the normalized lift coefficient varies linearly with normalized angle of attack to a high degree of accuracy at least over the safe operating range of the aircraft. For some aircraft however, the relationship between normalized lift coefficient and normalized angle of attack becomes slightly nonlinear as the stall point is approached. For some applications it may be desirable to make the output which is applied to the utilizing means vary more nearly as a linear function of normalized lift coefficient. In this case the output representing normalized angle of attack may be passed through a nonlinear means to produce a resultant output that varies more nearly linearly relative to normalized lift coefficient. Such a system is shown in the block diagram of FIG. 6.

Figure 7:
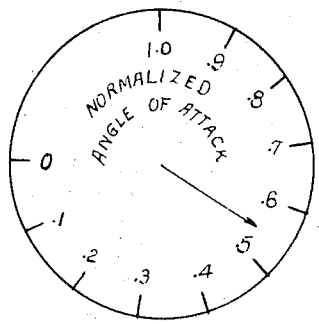
FIG. 7 is a face view of a dial and a relatively moving pointer comprising parts of my normalized angle of attack indicating system.

FIG. 7 shows a dial with a scale and a rotating pointer to indicate normalized angle of attack. The indicator may also be made with a vertical scale.

Figure 8:
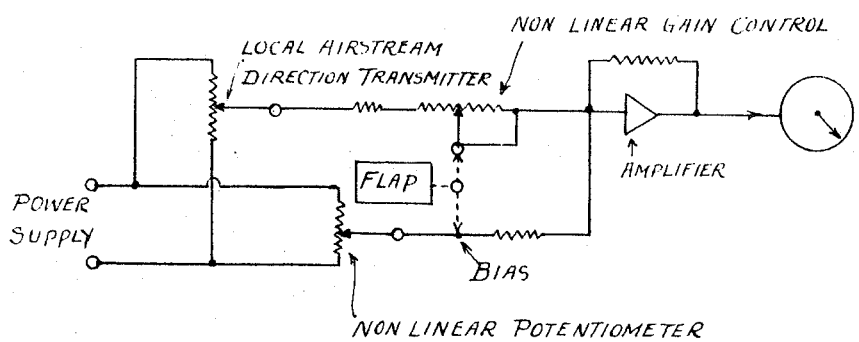
FIG. 8 shows details of an electrical circuit which performs the functions of the system shown as a block diagram in FIG. 2.

FIG. 8 shows details of an electrical circuit which performs the functions of the system shown as a block diagram in FIG. 2; however, my invention is not limited to electrical systems. Similar techniques may be used in the construction of the systems shown in the other block diagrams.

Some aircraft are constructed such that the flaps may be positioned only at certain discrete positions. In such a case there may be some advantage to normalizing the angle of attack system only for these discrete flap positions. Such a system using electrical techniques is shown in detail in FIG. 9. Even in aircraft in which the flaps may be adjusted to any desired value there may be some advantage to normalizing the angle of attack system only for certain discrete flap positions provided this is done in sufficiently small steps of flap position to insure that the system provides sufficient accuracy at any flap position.

For most aircraft the gain control and bias means must be nonlinear relative to flap position. If it is desirable to use a gain control for which the gain varies linearly relative to the control input and the gain must be a nonlinear function of flap position, a function generator may be connected between the flap position determining means and the gain control. Also, a function generator may be used as a bias means. Such a system is shown in FIG. 10.

In FIG. 11, part A, it can be seen that the local angle of attack at which the lift coefficient, $C_L$, reaches a maximum, $C_L$Max., and at which stall occurs is slightly different for different flap positions and that $C_L$Max. increases considerably as the flaps are extended. It is also evident that the local angle of attack at which zero aerodynamic lift occurs varies considerably with flap position. FIG. 11, part B, shows how normalized lift coefficient or $C_L/C_L$Max. varies relative to local angle of attack for the same aircraft for three different flap positions. The indication of normalized lift coefficient could be misleading, particularly in an aircraft subject to stable stall. In the latter case the indicator could indicate that the normalized lift coefficient is less than the maximum obtainable value without indicating whether the angle of attack is less than or greater than the stall value. In FIG. 11 part C it can be seen that for each flap position the normalized angle of attack is zero at the local angle of attack at which the lift coefficient is zero, that for each flap position the normalized angle of attack is 1.0 at the local angle of attack at which the lift coefficient reaches a maximum, and that the normalized angle of attack continues to increase past the value of 1.0 as the local angle of attack continues to increase past the stall point. Since the local angle of attack at which the lift coefficient reaches any particular value varies considerably with flap position, the combined output representing normalized angle of attack must include a bias which is a function of flap position. Since the slopes of the curves representing normalized angle of attack relative to local angle of attack is different for different flap positions, the combined output representing normalized angle of attack must include a component for which the ratio of a change in the combined output to the corresponding change in local angle of attack must be different for different flap positions. My system may be constructed by using various techniques such as mechanical, electrical, optical, pneumatic, hydraulic, etc., or various combinations of these techniques, but the basic principle remains the same. This basic principle consists of subjecting an output representing local angle of attack to a ratio and to a bias both of which are determined by flap positions.

I claim:

1. In an aircraft instrument system, an indicator showing the ratio of the existing absolute angle of attack to the maximum usable absolute angle of attack for a given flap position, an electrical power supply, a first electrical device connected with said power supply and having a first electrical output variable in accordance with local airstream direction, a second electrical device connected with said electrical power supply and having a second electrical output connected with said indicator, means operatively connecting said second electrical device with said flap to cause said second electrical output to vary in accordance with flap position, gain control means connecting the output of said first electrical device with said indicator, and means operatively connecting said gain control means with said flap to cause the gain of said gain control means to vary in accordance with flap position.

2. The aircraft instrument system as described in claim 1, and including an amplifier having its input connected with said gain control means and with said second electrical device, and having its output connected with said indicator.

3. The aircraft instrument system as described in claim 1, said indicator having a dial marked in steps from 0 to 1.

4. The aircraft instrument system as described in claim 1, said first electrical device comprising a potentiometer.

5. The aircraft instrument system as described in claim 1, said second electrical device comprising resistance elements connected with a plurality of contacts, and a wiper movable thereover.

6. The aircraft instrument system as described in claim 1, said gain control means comprising resistance elements connected with a plurality of contacts, and a wiper movable thereover.

7. The aircraft instrument system as described in claim 1, said first electrical device and the second electrical device and the gain control means comprising potentiometers.